United States Patent [19]

Lippits et al.

[11] Patent Number: 4,668,549
[45] Date of Patent: May 26, 1987

[54] OPTICALLY READABLE INFORMATION DISC

[75] Inventors: Gerardus J. M. Lippits; Petrus E. J. Legierse; George J. P. Dujardin, all of Eindhoven, Netherlands

[73] Assignee: U.S. Philips Corporation, New York, N.Y.

[21] Appl. No.: 824,993

[22] Filed: Feb. 3, 1986

[30] Foreign Application Priority Data

Sep. 6, 1985 [NL] Netherlands ......................... 8502448

[51] Int. Cl.$^4$ ........................................... G01D 15/14
[52] U.S. Cl. ..................................... 428/65; 430/271; 430/945; 369/284; 369/286; 369/288
[58] Field of Search .................. 428/65; 369/288, 284, 369/286; 346/135.1, 137; 430/271, 945

[56] References Cited

U.S. PATENT DOCUMENTS 4,423,427  12/1983  Kaiser ............................. 428/409 X

*Primary Examiner*—Alexander S. Thomas
*Attorney, Agent, or Firm*—Norman N. Spain

[57] ABSTRACT

Optically readable information disc having a substrate plate manufactured by an injection moulding process or a compression moulding process and composed of a mixture of 40–90% by weight of polymethylmethacrylate and 10–60% by weight of polyvinylchloride or chlorinated polyvinylchloride.

3 Claims, No Drawings

OPTICALLY READABLE INFORMATION DISC

BACKGROUND OF THE INVENTION

The invention relates to an optically readable information disc which comprises a substrate plate in the form of a disc manufactured from a synthetic resin and which comprises on one or on both sides a reflecting optical structure which is read by means of laser light via the substrate plate.

Such a disc is commercially available. An example is the video disc or laser vision disc which comprises optically readable video information. Another known example is the audio disc or compact disc which comprises optically readable audio information. Both in the video disc and the audio disc the reflecting optical structure comprises a usually spiral-shaped optically readable information track of information areas situated alternately at a higher level and at a lower level. The difference in height between the areas is 0.1–0.2 μm. The longitudinal dimensions vary in accordance with the stored information and are from a few tenths of a micron to a few microns. On the other side of the information track the disc is covered by a reflection layer, for example, a layer of Ag or Al. The video disc has comparatively large diametrical dimensions of, for example, 30 cm. The audio disc usually is considerably smaller and has a diameter, for example, of 10 cm.

A third type is the so-called recording disc. The reflecting optical structure comprises a recording layer, for example, a layer of dye, a layer of metal, for example Bi, a layer of a semiconductor element, for example Si, or a layer of chalcogenide, for example, a Te-Se alloy. By exposure to pulsated laser light, information bits are formed in recording layer which consists, for example, of holes or cavities in the recording layer, de-coloured spots or amorphous spots in a crystalline substrate, or conversely. The recording disc may comprise a follower track or servo track which may comprise optically readable information. The recorded information bits are read optically by means of laser light.

In applicants' opinion the quality of the substrate plate is of great importance for the quality and stability of the optically readable information disc. Various requirements have to be imposed upon the substrate plate. First of all the substrate plate must be transparent to the laser light used. The plate may show only a small birefringence. Internal stresses in the substrate plate which may be the result of the manufacturing process, for example, an injection moulding process or a compression moulding process, lead to an increased birefringence and must consequently be avoided. Another important factor is the non-defromability. In applicants' opinion two aspects play a role, namely the extent to which moisture is absorbed and again desorbed by the substrate material, as well as the shrinkage behaviour of the material. The shrinkage behaviour is the extent of plastic deformation under the influence of mechanical load and/or internal stresses. The glass transition temperature (devitrification temperature) of the material is an important parameter for the shrinkage behaviour. At a high glass transition temperature the shrinkage behaviour is favorable and the said plastic deformation is small.

So far a substrate plate of polymethylmethacrylate (PMMA) has been used for optically readable information discs having a comparitively large diameter, for example, the video disc. PMMA has a good optical quality with little or no birefringence. A disadvantage is that said disc is warped by the one-sided moisture absorption at the surface of the PMMA substrate plate remote from the optical structure. In order to mitigate this, or rather to compensate for said warping effect, two information discs are adhered together, the optical structures facing each other.

For optically readable information discs having a small diameter, for example, the audio disc, a substrate plate of polycarbonate is used. Polycarbonate, compared with PMMA, has the big advantage of a low moisture absorption. The optical quality of polycarbonate is good. The stronger birefringence of polycarbonate as compared with PMMA is admissible. Unfortunately, polycarbonate cannot be used in information carriers having comparatively large dimensions, for example the video disc. The manufacture of such discs by means of injection moulding requires such process conditions in regard to temperature of the polycarbonate and of the propellant screw and matrix, injection speed profile and pressure variations, that an unacceptable. birefringence is the result.

BRIEF SUMMARY OF THE INVENTION

It is the object of the invention to provide a solution to the above-mentioned problems. A more particular object of the invention is to provide, for optically readable information discs, a transparent synthetic resin substrate plate which has good optical and mechanical properties, can be used in information discs of a variety of dimensions and is inexpensive.

These objects are achieved by means of an optically readable information disc as described in the opening paragraph which is characterized in that the substrate is a body which is manufactured by means of an injection moulding or a compressing moulding process and which is composed of a mixture of 40–90% by weight of polymethylmethacrylate and 10–60% by weight of polyvinylchloride or chlorinated polyvinylchloride.

Polyvinylchloride and chlorinated polyvinylchloride are inexpensive.

Chlorinated polyvinylchloride is a known product which per structure unit comprises an average number (x) of chlorine atoms of $1<x<2$.

The substrate plate is manufactured by means of an injection moulding process or a compression moulding process. The substrate may be provided with an optical structure. For that purpose, the injection mould or compression mould comprises a matrix the surface of which has an optical structure which is the negative of that of the information disc to be manufactured. It is alternatively possible to provide the optical structure in a layer of a light-cured lacquer present on the substrate. For this purpose a layer of a light-curable lacquer, for example, of acrylates, is provided on the surface of a matrix which is provided with the negative of the desired optical structure. The transparent substrate plate is placed on the layer of lacquer. The layer is exposed to, for example, UV light via the substrate plate and the assembly of substrate plate and the cured lacquer layer bonded thereto and in which the optical structure is copied is removed from the matrix surface.

In video discs and audio discs a reflection layer of a metal, for example Ag or Al, is provided on the side of the optical structure. In recording discs the above-described recording layer is provided on the substrate plate which may be provided with a servo track. Auxiliary layers, for example, a heat conducting layer, may be provided between the substrate plate and the recording layer. The reflection layer and the recording layer may be provided on the outside with one or more protective layers.

DETAILED DESCRIPTION OF THE INVENTION

In a favourable embodiment the substrate plate is composed of 40-60% by weight of polymethylmethacrylate and 60-40% by weight of polyvinylchloride. A very suitable composition of the substrate plate is 60% by weight of polyvinylchloride and 40% by weight of polymethylmethacrylate.

The substrate plate used in accordance with the invention only has a small birefringence which does not present any problems in the optical reading process. This is striking since the component polyvinylchloride in itself shows a high birefringence. The substrate in accordance with the invention is non-deformable. Climate tests have demonstrated that no deformation such as warping occurred. According to the climate test the information disc is stored at 45° C. and a relative humidity of 95% for a longer period of time. By using the substrate plate in accordance with the invention a reduced moisture absorption is achieved. The raw material used is much cheaper than polycarbonate and due to the low birefringence is easy to injection mould.

The invention will be described in greater detail with reference to the specific example.

SPECIFIC EXAMPLE

In an injection moulding process a mould is filled with a melted mixture of polyvinylchloride and polymethylmethacrylate. The composition of the mixture is recorded in the table below, first column. The matrix present in the injection mould comprises at its surface an optically readable information track of information areas situated alternately at a higher level and at a lower level. Said information track is the negative of the information track desired in the final product. After cooling the resulting information disc is provided with a reflection layer of Al on the side of the information track. The diameter of the information disc is 30 cm.

The information disc was subjected to a climate test at an elevated temperature of 45° C. and a relative humidity of 95% for 3 weeks. It was evaluated whether any change in shape had taken place and in particular whether the information disc showed any warping. The results are recorded in column 2 of the table in which the symbol(+) denotes a positive result, i.e. no deformation and the symbol(−) denotes a negative result, i.e. some deformation has taken place.

The birefringence was determined in various places distributed over the surface of the information disc. The results are recorded in column 3 of the table in which (+) denotes a low, acceptable birefringence and (−) denotes too high a birefringence.

TABLE

| Composition | | | |
|---|---|---|---|
| PMMA % by weight | PVC % by weight | Non-deformability | Birefringence |
| 100 | 0 | − | + |
| 0 | 100 | + | − |
| 40 | 60 | + | + |
| 50 | 50 | + | + |
| 60 | 40 | + | + |
| 80 | 20 | + | + |
| 30 | 70 | + | − |
| 20 | 80 | + | − |
| 10 | 90 | + | − |
| Polycarbonate | | + | − |

What is claimed is:

1. An optically readable information disc comprising a substrate plate in the form of a disc manufactured from a synthetic resin and which comprises on one or both sides a reflecting optical structure which is read by means of laser light via the substrate plate, characterized in that the substrate plate is a body which is manufactured by means of an injection moulding process or a compression moulding process and is composed of a mixture of 40-80% by weight of polymethylmethacrylate and 20-60% by weight of polyvinylchloride or chlorinated polyvinylchloride.

2. An optically readable information disc comprising a substrate plate in the form of a disc manufactured from a synthetic resin and which comprises on one or both sides a reflecting optical structure which is read by means of laser light via the substrate plate, characterized in that the substrate plate is manufactured by means of an injection moulding process or a compression moulding process and is composed of a mixture of 40-80% by weight of polymethylmethacrylate and 20-60% by weight of polyvinylchloride.

3. An optically readable information disc comprising a substrate plate in the form of a disc manufactured from a synthetic resin and which comprises on one or both sides a reflecting optical structure which is read by means of laser light via the substrate plate, characterized in that the substrate plate is manufactured by means of an injection moulding process or a compression moulding process and is composed of a mixture of 40-60% by weight of polymethylmethacrylate and 60-40% by weight of polyvinylchloride.

* * * * *